(12) United States Patent
Smelt

(10) Patent No.: US 6,330,211 B1
(45) Date of Patent: *Dec. 11, 2001

(54) APPARATUS FOR PLAYING BACK INFORMATION DIGITALLY STORED ON AN OPTICAL RECORD CARRIER USING NAVIGATION PARAMETERS

(75) Inventor: Gerardus J. A. Smelt, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/431,495

(22) Filed: Nov. 1, 1999

(30) Foreign Application Priority Data

Oct. 30, 1998 (DE) .............................................. 198 50 018

(51) Int. Cl.⁷ ................................................. G11B 17/22
(52) U.S. Cl. ............................................................... 369/32
(58) Field of Search .............................. 369/32, 33, 47.1, 369/47.15, 47.16, 47.23; 386/95, 125, 126

(56) References Cited

U.S. PATENT DOCUMENTS

| | | | |
|---|---|---|---|
| 4,882,719 | * 11/1989 | Kimura et al. | 369/32 |
| 4,922,476 | * 5/1990 | Kiyoura et al. | 369/32 |
| 5,157,646 | * 10/1992 | Amemiya et al. | 369/32 |
| 5,241,659 | * 8/1993 | Parulski et al. | 369/32 |
| 5,301,172 | * 4/1994 | Richards et al. | 369/32 |
| 5,543,925 | * 8/1996 | Timmermans | 386/40 |
| 5,633,726 | * 5/1997 | Timmermans | 386/70 |
| 6,016,381 | * 1/2000 | Taira et al. | 386/95 |

FOREIGN PATENT DOCUMENTS

9809290A1   3/1998   (WO) .

* cited by examiner

Primary Examiner—Tan Dinh
(74) Attorney, Agent, or Firm—Michael E. Belk

(57) ABSTRACT

The invention relates to an apparatus for playing back information digitally stored on an optical record carrier, comprising
a control circuit by means of which the display and/or reproduction of information, particularly video and/or audio information is selectable and/or controllable,
a parameter memory for storing navigation parameters during playback of a record carrier, wherein the apparatus comprises a first non-volatile memory (10) which is controllable by means of the control circuit (6), and the first non-volatile memory (10) is provided for storing temporal sequences of the navigation parameters.

10 Claims, 4 Drawing Sheets

APPARATUS FOR PLAYING BACK INFORMATION DIGITALLY STORED ON AN OPTICAL RECORD CARRIER USING NAVIGATION PARAMETERS

FIELD OF THE INVENTION

BACKGROUND OF THE INVENTION

The invention relates to an apparatus for playing back information digitally stored on an optical record carrier, comprising a control circuit by means of which the display and/or reproduction of information, particularly video and/or audio information, is selectable and/or controllable, a parameter memory for storing navigation parameters during playback of a record carrier.

An apparatus of this type is known from, for example, WO 98/09290. This known apparatus is provided for playing back digital video record carriers. To control the display of the audio and/or video program, the known apparatus has navigation commands and navigation parameters. Generally, those parameters are understood to be navigation parameters whose information is stored by the playback apparatus during the playback process. The navigation parameters comprise, for example, parameters to which a predetermined function is assigned and also parameters which can be freely used by the provider and are, for example, usable for modifying the behavior of the playback apparatus or for storing the user-performed operations, decisions and/or wishes. Navigation commands and navigation parameters are the basis for providers of record carriers for creating different title structures. The providers can use the navigation commands and navigation parameters for adjusting or changing the status of the playback apparatus, for example, for implementing a parental control system which denies children access to predeterminable video programs.

The provider can define simple and complex branch structures in a title by means of the navigation commands and the navigation parameters.

The navigation parameters of record carriers based on the DVD standard are set to zero at the start and the end of a playback process of a record carrier. The navigation parameters of record carriers in accordance with the HQ-Video CD (High Quality Video Compact Disc) standard are undefined at the start and at the end of the playback process.

SUMMARY OF THE INVENTION

It is an object of the invention to provide an apparatus of the type described in the opening paragraph, which provides the possibility of evaluating the playback processes of record carriers.

According to the invention, this object is solved in that the apparatus comprises a first non-volatile memory which is controllable by means of the control circuit, and in that the first non-volatile memory is provided for storing temporal sequences of the navigation parameters.

The non-volatile storage of the temporal sequences of the navigation parameters provides the possibility of making the temporal history of the change of the navigation parameters of one or more playback processes electronically available to the user of the apparatus. This allows a simple evaluation and analysis of one or more playback processes of record carriers with reference to the temporal change of the navigation parameters. By means of the recorded navigation parameters, the behavior of the user during the playback process of the record carrier can thus be analyzed.

In accordance with the advantageous embodiment of the invention as defined in claim 2, the apparatus has an interface by means of which the navigation parameters stored in the first non-volatile memory can be read from the apparatus. An example of an interface is an RS-232 interface. The navigation parameters read by means of the interface can then be further processed and analyzed, for example, by means of a computer.

The advantageous embodiment of the invention as defined in claim 3 provides a particularly simple possibility of realizing the first non-volatile memory, because the individual memory fields of the first non-volatile memory no longer need to be provided with an individual address. The navigation parameters are temporally and serially written into the first non-volatile memory. With each new writing operation, the navigation parameters already stored are shifted one memory location further down, while the new navigation parameters to be stored are stored in the upper memory field of the first non-volatile memory. The navigation parameters which are present in the lower memory field of the first non-volatile memory are preferably erased at the next writing operation. In a first non-volatile memory with N memory locations for navigation parameters, the last N navigation parameters are thus stored.

In accordance with the advantageous embodiment of the invention as defined in claim 4, the individual memory fields of the first non-volatile memory are individually addressable. In such a memory, the navigation parameters can be stored by means of address indicators in the memory fields provided with addresses. The storage of new navigation parameters and the erasure of old navigation parameters can be implemented by means of a software algorithm. Such a memory has the advantage that, when storing new navigation parameters, only one memory field of the first non-volatile memory has to be changed.

The temporal sequence of storing the navigation parameters in the first nonvolatile memory may be preferably realized as defined in claim 5. Dependent on the application and wishes of the user, other instants or results for which the navigation parameters are stored may also be defined.

In accordance with the advantageous embodiment of the invention as defined in claim 6, a second non-volatile memory, in which navigation parameters can also be stored, is provided in addition to the first non-volatile memory. In the second non-volatile memory, the navigation parameters are provided with record carrier identification information, for example, a record carrier identification number which allows an unambiguous assignment of the navigation parameters to the associated record carrier. The second non-volatile memory is preferably provided to store final results, i.e. the last current navigation parameters of a playback process. This provides the possibility of exchanging information between different playback process. The exchange of information may be realized both between different playback processes of one and the same record carrier. It is also possible to utilize the playback navigation parameters of a first record carrier for playback of a second record carrier. This is particularly advantageous for series of record carriers, for example for a training course comprising several record carriers.

At the start of a playback process, it can be checked by means of the control circuit whether the relevant record carrier is provided with record carrier identification information. If the relevant record carrier is provided with record carrier identification information, the control circuit checks whether navigation parameters corresponding to this record carrier identification information are stored in the first non-volatile memory. If this is the case, the navigation parameters can be read from the second non-volatile memory, written into the parameter memory, and used for the subsequent playback process of the record carrier. Both a RAM memory and a register memory may be used as a parameter memory.

The invention as defined in claim 7 is particularly suitable for apparatuses based on the DVD (Digital Video Disc) standard. In accordance with the DVD standard, 16 general parameters are provided as navigation parameters which have a length of 2 bytes each. These general parameters are available for the providers of record carriers so as to store the operation behavior of the user and to influence or control the behavior of the playback apparatus. The general parameters can be accessed by means of navigation commands. By storing the general parameters in the first and/or second non-volatile memory, information about a playback process of a record carrier can be stored. This information may be loaded from the second non-volatile memory for playback at a later stage of the same record carrier or for playback at a later stage of another record carrier and used as a basis for the later playback process.

As defined in claim 8, the apparatus according to the invention is particularly suitable for apparatuses based on the HQ-Video-CD standard (High Quality Video Compact Disc). In accordance with the HQ-Video-CD standard, at least 16 user parameters of 2 bytes each are provided as navigation parameters. According to the invention, these user parameters are stored in the first non-volatile memory and are thus available for playback at a later stage.

The storage of the temporal sequence of the navigation parameters may be preferably used for analyzing the user behavior with regard to record carrier applications. Particularly in the case of record carriers for training or learning courses, it is important for the manufacturers to know the behavior of the user during playback of these record carriers. For example, by means of storing the navigation parameters in the first non-volatile memory, it can be analyzed which modules of the training or learning programs are used in what frequency and what sequence. By evaluating these data of a multitude of users, the corresponding training or learning program stored on the relevant record carrier may be improved.

A further advantageous possibility of application is the analysis of the user behavior of apparatuses arranged as information systems in, for example, shopping centers or public institutions. For example, the number of users, the spectrum of user questions and the like can be stored in the first non-volatile memory. This information may be evaluated at a later stage, for example, for marketing purposes.

A further possibility of application is the error search, for example, in new record carrier applications. If the application stored on the record carrier may have errors or deficiencies, they can be easily identified and eliminated on the basis of the navigation parameters stored in the first non-volatile memory.

The structure of the first non-volatile memory can be realized in many ways and may be adapted to the user's requirements. The information stored in the first non-volatile memory may also be provided with record carrier identification information. Consequently, the temporal sequences of the navigation parameters can also be assigned to one or several record carriers.

These and other aspects of the invention are apparent from and will be elucidated with reference to the embodiments described hereinafter.

DETAILED DESCRIPTION OF THE INVENTION

Figure 1:
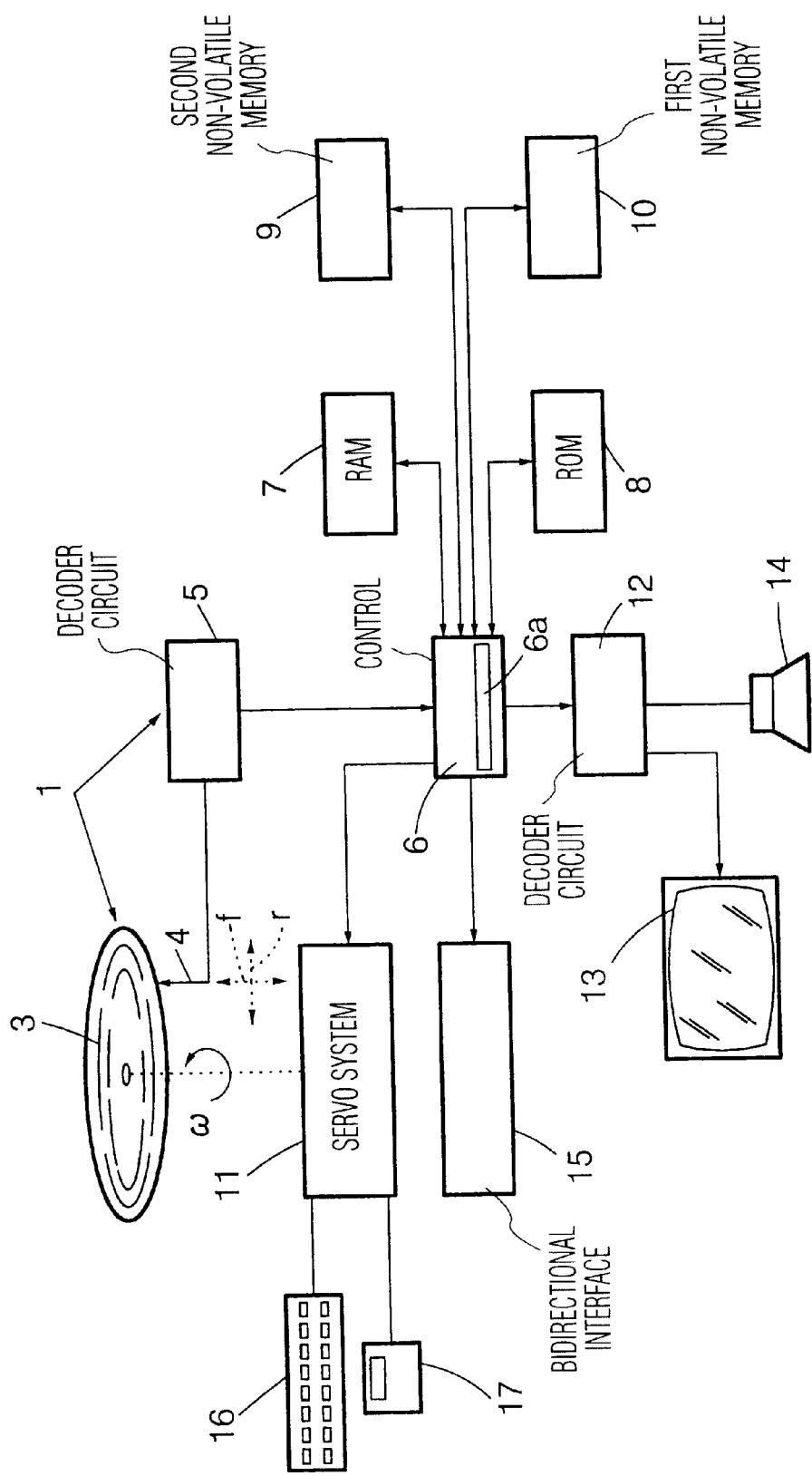
FIG. 1 is a block diagram of an apparatus according to the invention for playing back information digitally stored on an optical record carrier.

FIG. 1 shows an optical record player system 1 with an optical record player 2 which is provided for playing back information digitally stored on an optical record carrier 3. The optical record carrier 3 is particularly a record carrier based on the DVD standard, or a record carrier based on the HQ-Video CD standard. The information which is digitally stored on the optical record carrier 3 is read by means of an optical read unit 4 and applied to a decoder circuit 5. The decoder circuit 5 is further provided for error correction. The decoded and error-corrected data are applied to a control circuit 6.

The control circuit 6 is coupled to a RAM memory 7, a ROM memory 8, a second non-volatile memory 9 and a first non-volatile memory 10. The RAM memory 7 and the ROM memory 8 are provided to control and process the data stream which is applied from the decoder circuit 5 to the control circuit 6. The second non-volatile memory 9 and the first non-volatile memory 10 are provided for non-volatile storage of navigation parameters. The control circuit is further coupled to a servosystem 11 which controls the angle velocity ω of the optical record carrier as well as the position of the optical read unit 4 as regards the tracks in the optical record carrier 3. This is denoted by the broken-line arrow r. Furthermore, the servosystem 11 controls the focusing of the optical read unit 4, which is denoted by the broken-line arrow f. The control circuit 6 transmits relevant control signals to the servosystem 11.

The control circuit 6 is also coupled to a decoder circuit 12. The decoder circuit 12 is provided to decode, for example, the video and audio data coded in accordance with the MPEG2 standard. The decoder circuit 12 supplies the decoded video data to a display 13 and the decoded audio data to a loudspeaker or a loudspeaker system 14. For a bidirectional data exchange with external components, the optical record carrier 2 has a bidirectional interface 15. A keyboard 16, an external data memory 17 such as, for example, a disc drive as well as further external components can be connected to the bidirectional interface 15. On the one hand, external data which are supplied, for example, via the keyboard 16 may be applied to the optical record carrier 2 via the bidirectional interface 15. On the other hand, internal data can be applied from the optical record carrier 2 to external components such as, for example, the external data memory 17.

The control circuit 6 has internally a register 6a which is capable of provisionally storing information and supplying it with a short access time.

Figure 2:
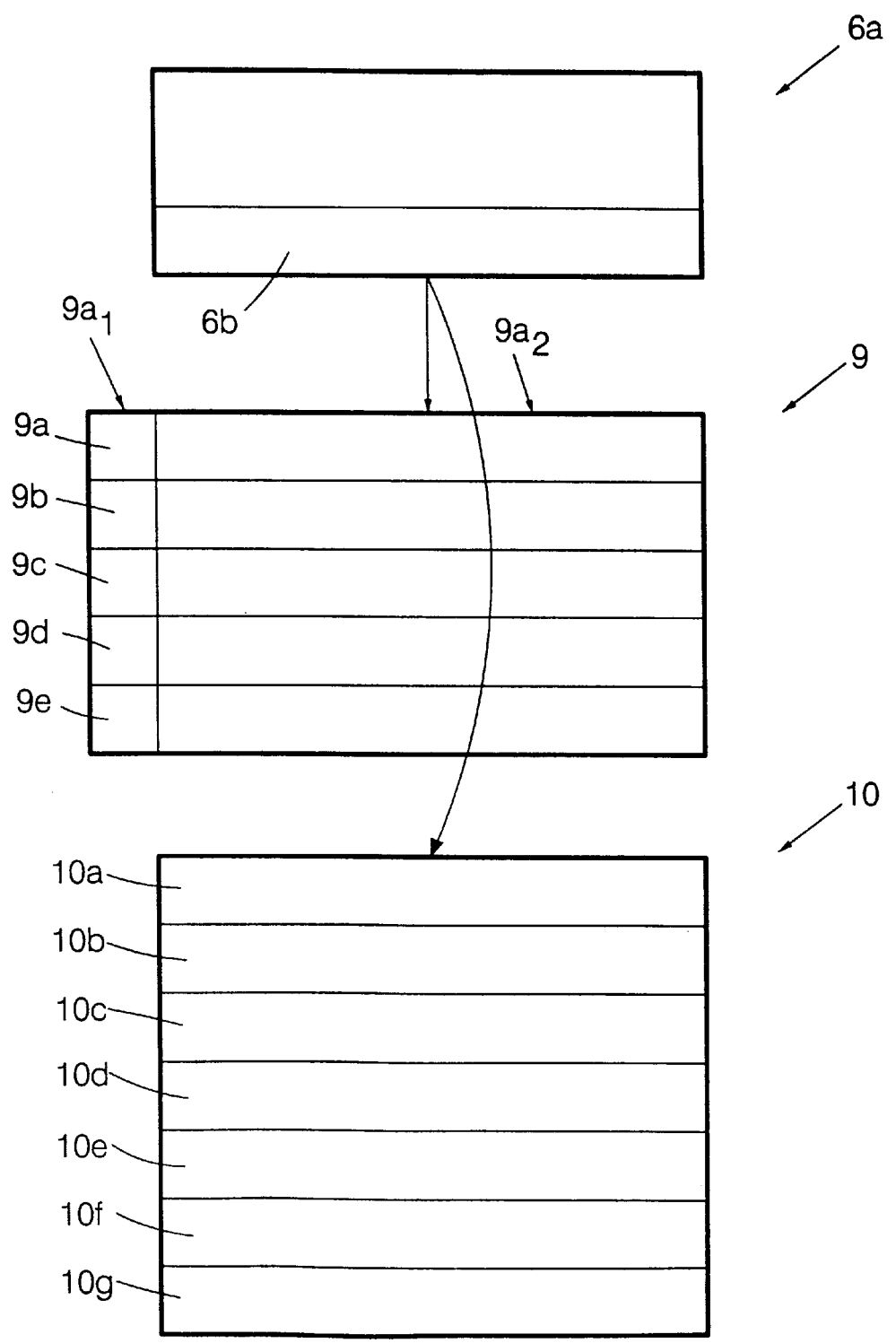
FIG. 2 shows the storage organization for the navigation parameters with a register memory, a non-volatile address memory and a non-volatile serial buffer memory.

FIG. 2 shows, by way of example and in greater detail the register 6a, the second non-volatile memory 9 and the first non-volatile memory 10 in accordance with FIG. 1. The memory elements shown in FIG. 2 are dimensioned for apparatuses based on the DVD standard. In accordance with the DVD standard, 16 general parameters are available as navigation parameters, each having a length of 2 bytes. These general parameters are available as standards for the providers of optical record carriers so as to, for example, store the operation behavior of the user and/or influence or control the behavior of each playback apparatus. The register 6a has a memory field 6b of 32 bytes which is provided for storing the general parameters. The second non-volatile memory 9 has five memory fields 9a to 9e of 34 bytes each in the example shown. The individual memory fields 9a to 9e have record carrier identification fields $9a_1$, $9b_1$, $9c_1$, $9d_1$, and $9e_1$, of 2 bytes each, as well as navigation parameter fields $9a_2$, $9b_2$, $9c_2$, $9d_2$ and $9e_2$ of 32 bytes each. The navigation parameter fields $9a_2$ to $9e_2$ are provided for storing the general parameters of the DVD standard. The record carrier identification fields $9a_1$, to $9e_1$, are provided for storing a record carrier identification number which provides the possibility of an assignment between the stored general parameters and the relevant record carrier corresponding to these general parameters. The first non-volatile memory 10 is constituted by a serial, cyclic buffer memory. In the following example, it has seven memory fields 10a, 10b, 10c, 10d, 10e, 10f and 10g comprising 32 bytes each. The first non-volatile memory 10 is provided to store a temporal sequence of the general navigation parameters. In the relevant example, the first non-volatile memory has no record carrier identification fields so as to save memory locations and realize the memory in a possibly simple manner. However, it is also possible to provide a plurality of serial cyclic memories and give them a record carrier identification field so as to be able to store also temporally serial sequences of the general navigation parameters of different record carriers. The memory fields 9a to 9e of the second non-volatile memory 9 can be addressed individually. The first non-volatile memory 10 has only one common memory address. Navigation parameters to be newly stored are always initially written into the upper memory field 10a of the first nonvolatile memory 10. In the subsequent storage process, the new navigation parameters are stored in the upper memory field 10a, and the navigation parameters which are already present in the first non-volatile memory 10 are shifted one memory field further down, i.e. the navigation parameters of the memory field 10a are shifted into the memory field 10b, the navigation parameters of the memory field 10b are shifted into the memory field 10c, and so forth. The navigation parameters stored in the lowest memory field 10g are erased at a subsequent, new storage process. Thus, the seven last stored general navigation parameters are present in the first non-volatile memory 10.

Figure 3:
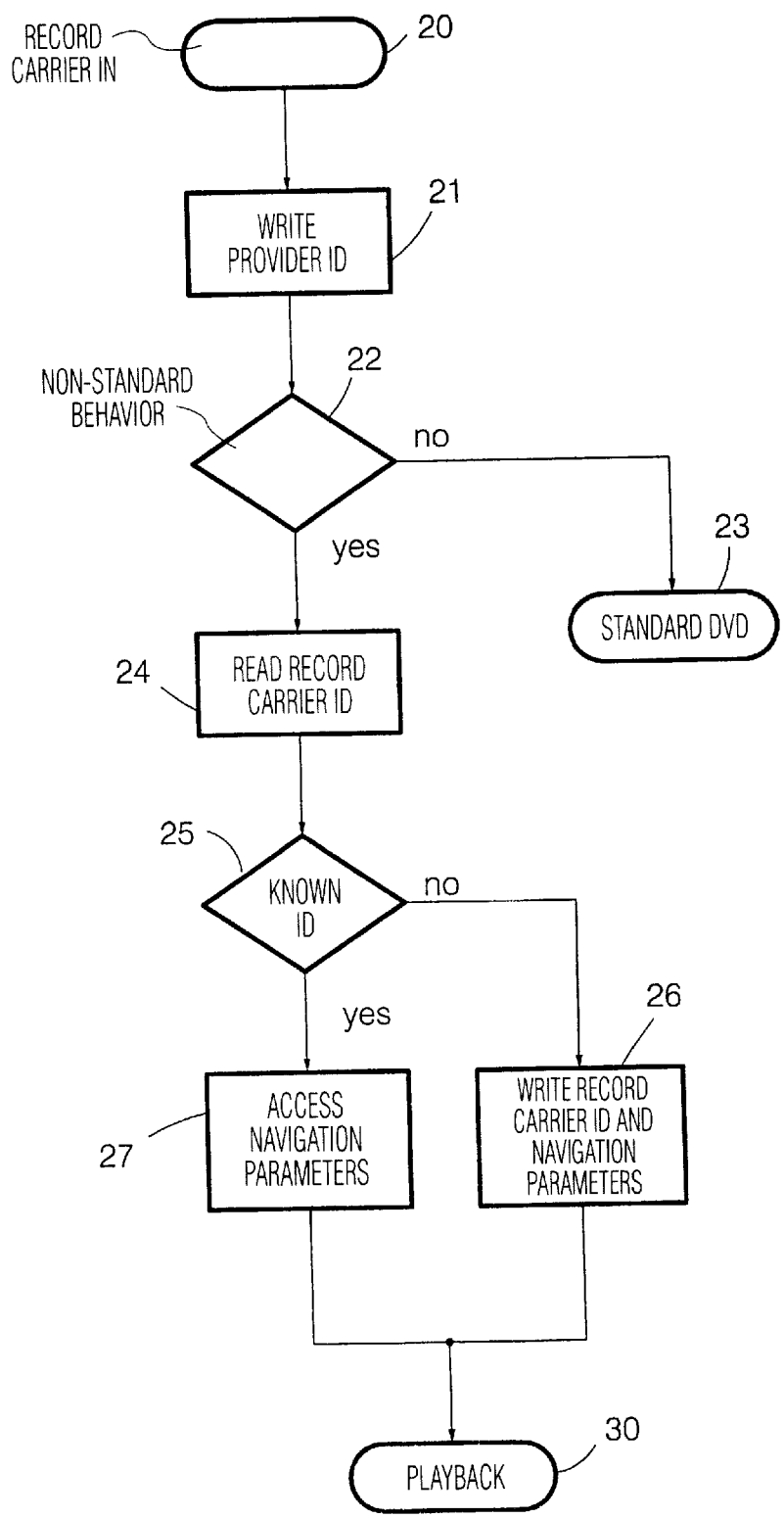
FIG. 3 is a flow chart illustrating the operation of writing a record carrier based on the DVD standard.

FIG. 3 shows a flow chart of the process of writing a record carrier based on the DVD standard. This writing process is performed whenever a record carrier 3 is inserted into the optical record player 2.

A first block 20 represents the result "record carrier-in", i.e. an optical record carrier 3 has been inserted into the optical record player 2 in accordance with FIG. 1. Subsequently, a provider ID is written in a block 21. The provider ID is characteristic information which is stored in a standard form on a defined location of the DVD record carrier. With reference to the provider ID, it is checked in a subsequent step 22 whether the optical record player 2 is to operate in accordance with the DVD standard or whether, in accordance with the provider ID, a non-standard behavior is desired by the provider. To this end, the four last letters of the provider ID are checked in the block 22. When these four last letters have a given letter combination, for example, the letter combination GRPM, then the optical record player 2 recognizes that the provider has provided a non-standard playback behavior, i.e. a non-volatile storage of the general navigation parameters.

In accordance with the DVD standard, the general navigation parameters are set to zero at the start and the end of every playback process. Therefore, it is not possible in the case of standard behavior of the DVD apparatus to store data relating to a playback process of a CD and to make them available for playback at a later stage. This possibility is provided by the non-standard behavior of the optical record player 2. When the four last letters of the provider ID are unequal to GRPM, then the optical record player switches to the standard DVD behavior, which is shown in the block 23 in FIG. 3. When the four last letters of the provider ID are equal to GRPM, then the optical record player recognizes that it is not to operate in accordance with the DVD standard, i.e. the general parameters are not to be set to zero at the start and the end of a playback process. In the block 24, a record carrier identification number is therefore initially read from the record carrier. This record carrier identification number is stored at a defined location on the record carrier. In a subsequent step 25, it is checked whether the record carrier identification number is known to the optical record player, i.e. whether already general navigation parameters are already stored under this record carrier identification number in the second non-volatile memory. If this is not the case, the record carrier identification number is written in a step 26 into one of the record carrier identification fields $9a_1$, to $9e_1$, and the assigned memory field is thus initialized for storage of the assigned navigation parameters. To this end, one of the memory fields 9a to 9e, which is not yet occupied, is selected. When all memory fields 9a to 9e are occupied with information, the memory field having the oldest information is erased and made available for the new record carrier identification number. Simultaneously, the access path is formed for the envisaged memory field.

When it is determined in block 25 that the record carrier identification number is known and that general navigation parameters for this record carrier identification number are stored in the second non-volatile memory 9, then the access path is formed in a step 27 for that memory field of the memory fields 9a to 9e in which the general navigation parameters assigned to the relevant record carrier identification number are stored.

In the subsequent playback process, represented by the block 30, the general navigation parameters stored at the end of the previous playback process of the record carrier are now available.

Figure 4:
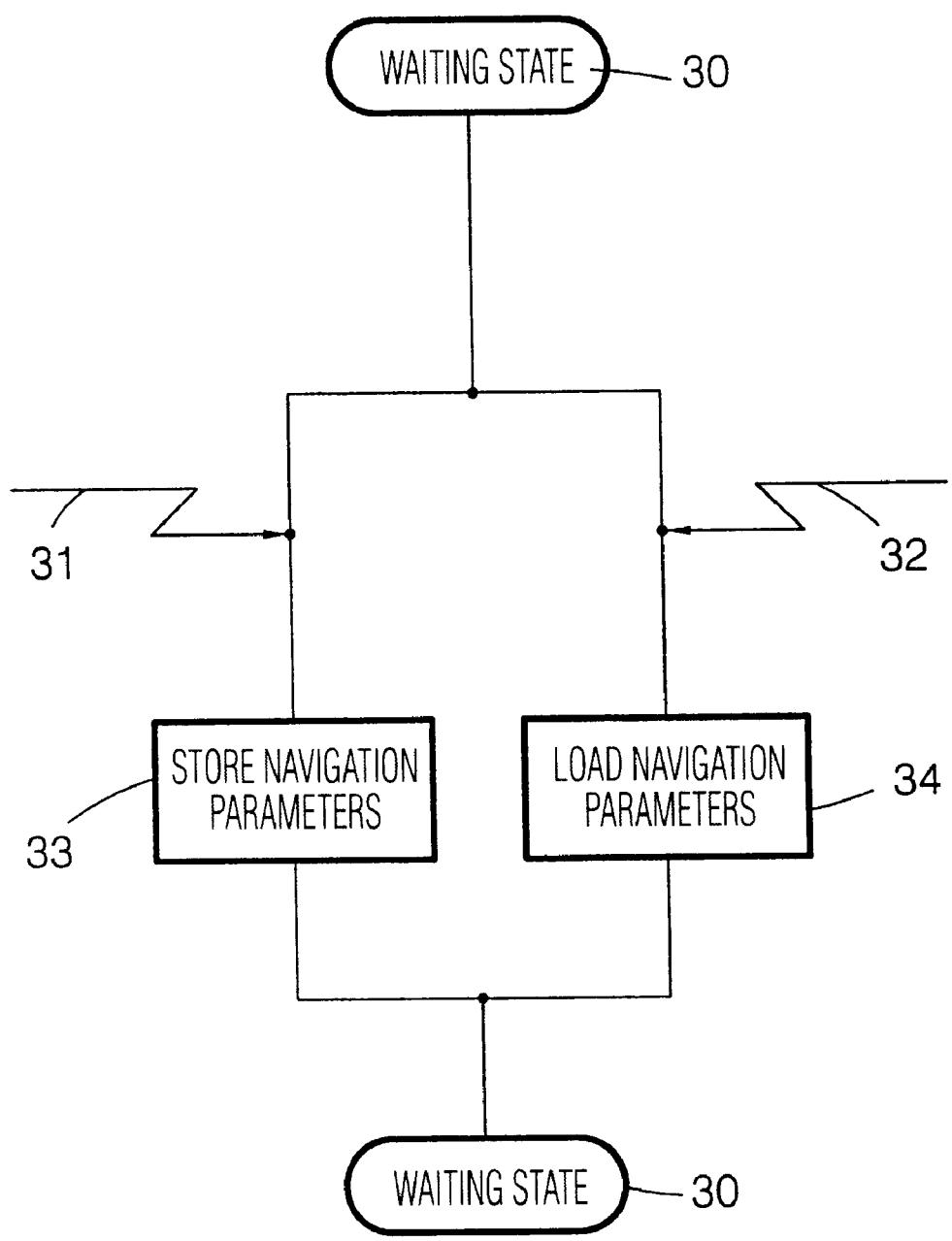
FIG. 4 is a flow chart illustrating the storage of the general parameters in the address memory and/or the serial buffer memory during playback of a DVD record carrier.

FIG. 4 shows a flow chart of storing the general parameters in the second non-volatile memory 9 and in the first non-volatile memory 10, as well as loading the general parameters from the second non-volatile memory 9 during playback of a DVD record carrier, which storage and loading are controlled by means of the control circuit 6. Initially, the optical record player 2 is in a waiting state 30 as regards the second non-volatile memory 9 and the first non-volatile memory 10. During this waiting state 30, a playback process of the optical record carrier 3 takes place, i.e. the control circuit 6 is continuously supplied with information by means of the optical read unit 4 and the decoder circuit 5. In accordance with the information applied to the control circuit 6, also the general navigation parameters stored in the memory field 6b of the register 6a may change. The change of the general navigation parameters is dependent on the way in which the provider of the record carrier makes use of the general navigation parameters. The provider of the record carrier may determine, by corresponding program sequence structures on the record carrier, when and under what conditions the general navigation parameters are to be written from the register 6a into the first non-volatile memory 10 and/or the second non-volatile memory 9. For this purpose, two specific commands are provided, which are recognized by the control circuit 6. As a first control command, an addition of the value of zero to the memory field 6b of the register 6a is provided. Such an addition of the value of zero does not change anything in the memory field 6b of the register 6a. The control circuit 6 of course recognizes that such a control command not influencing the register 6a was present in the data stream supplied by the record carrier 3. This result "addition of zero to the memory field 6b of the register 6a" is denoted by the reference numeral 31 in the FIG. 4 flow chart. When this result 31 occurs, the control circuit 6 stores the general parameters stored in the memory field 6b of the register 6a in the second non-volatile memory 9 under the relevant record carrier identification number as well as simultaneously in the upper memory field 10a of the first serial non-volatile memory 10. This is shown as block 33 in FIG. 4. After performing this storage, the optical record player 2 again assumes the waiting state 30. A further control command relating to the first non-volatile memory 10 is the control command "subtract zero from the general navigation parameters stored in the memory field 6b". This result is denoted by the reference numeral 32 in the FIG. 4 flow chart. The value of the general navigation parameters stored in the memory field 6b is neither changed by this "subtract zero" command. However, the control circuit 6 recognizes when such a command is present in the data stream read from the optical record carrier 3. When this control command is recognized, the control circuit 6 loads the general navigation parameters from the second non-volatile memory 9 into the memory field 6b of the register 6a. Subsequently, the system changes to the waiting state 30 again as regards the storage operations of the second non-volatile memory 9 and the first non-volatile memory 10.

The general navigation parameters stored in the second non-volatile memory 9 and in the first non-volatile memory 10 may be both externally read and externally changed by means of the bidirectional interface 15. For external reading, an external data processing unit, for example, a computer may be used. For external influencing, for example, pagers, a keyboard or a bar code reader and an external timer are feasible.

The system according to the invention thus provides the possibility of storing results of a playback process of a record carrier in the second non-volatile memory 9 and in the first non-volatile memory 10 and making them available for playback at a later stage. Furthermore, the first non-volatile memory 10 provides the possibility of recording temporal sequences of the change of the general navigation parameters, reading them via the bidirectional interface 15 and then evaluating them by means of external data processing units.

Moreover, the bidirectional interface provides the possibility of externally writing information for playback of a record carrier into the second non-volatile memory 9 and thereby externally influence and control playback of the record carrier.

What is claimed is:

1. An apparatus for playing back information digitally stored on an optical record carrier, comprising a control circuit by means of which the display or reproduction of information, including video or audio information is selectable or controllable, a parameter memory for storing navigation parameters during playback of a record carrier, wherein the apparatus comprises a first non-volatile memory which is controllable by means of the control circuit, and wherein the first non-volatile memory is provided for storing temporal sequences of the navigation parameters.

2. An apparatus as claimed in claim 1, wherein an interface is provided for reading the temporal sequences of the navigation parameters from the first non-volatile memory.

3. An apparatus as claimed in claim 1, wherein the first non-volatile memory is a serial, cyclic buffer memory in which the temporal sequences of the navigation parameters are serially writable.

4. An apparatus as claimed in claim 1, wherein the first non-volatile memory is an address memory whose memory fields are individually addressable.

5. An apparatus as claimed in claim 1, wherein the navigation parameters are stored in the first non-volatile memory in predetermined time intervals or at the end of each playback process or at any change of the navigation parameters.

6. An apparatus as claimed in claim 1, wherein the apparatus further comprises a second non-volatile memory which is controllable by means of the control circuit, wherein the second non-volatile memory is provided for storing the navigation parameters, wherein the navigation parameters are stored together with record carrier identification information in the second non-volatile memory, allowing assignment of the navigation parameters to the relevant record carrier, wherein, at the start of a playback process of a record carrier, the navigation parameters assigned to said record carrier are readable from the second non-volatile memory and writable into the parameter memory.

7. An apparatus as claimed in claim 1, wherein the apparatus is a DVD (Digital Video Disc) apparatus for playing back record carriers in accordance with a DVD standard, and in that the general parameters based on the DVD standard are provided as navigation parameters for storage in the first non-volatile memory.

8. An apparatus as claimed in claim 1, wherein the apparatus is a HQ-Video-CD (High Quality Video Compact Disc) apparatus for playing back record carriers in accordance with a HQ-Video-CD standard, and in that the user parameters based on the HQ-Video-CD standard are provided as navigation parameters for storage in the first non-volatile memory.

9. An apparatus as claimed in claim 1, wherein the apparatus is used for analysis of the user behavior with regard to record carrier applications.

10. An apparatus as claimed in claim 1, wherein the apparatus is used for error search in record carrier applications.

* * * * *